United States Patent [19]
Phillippi

[11] 3,732,984
[45] May 15, 1973

[54] APPARATUS FOR PRODUCING A CONTINUOUS COUNTER-CURRENT EFFECT

[76] Inventor: Charles G. Phillippi, 3414 Bonneville Drive, Charlotte, N.C. 28205

[22] Filed: Apr. 24, 1970

[21] Appl. No.: 31,481

[52] U.S. Cl. ................................................210/289
[51] Int. Cl. ............................................B01d 29/08
[58] Field of Search..........................210/30, 80, 279, 210/289, 24

[56] References Cited
UNITED STATES PATENTS

3,557,955  1/1971  Hirs..................................210/279 X
3,205,166  9/1965  Ludlow et al......................210/24 X

*Primary Examiner*—Samih N. Zaharna
*Attorney*—Lane, Aitken, Dunner and Ziems

[57] ABSTRACT

Solid-liquid contacting device having means for continuously changing the position of inlet and outlet ports in the solids bed for simulating a continuous counter-current flow of solids and liquid. Method of simulating a continuous counter-current flow of solids and liquid.

6 Claims, 33 Drawing Figures

INVENTOR.
CHARLES G. PHILLIPPI
BY
Lane, Aitken, Dunner + Ziems
ATTORNEYS

PATENTED MAY 15 1973

INVENTOR.
CHARLES G. PHILLIPPI
BY
Lane, Aitken, Dunner & Ziems
ATTORNEYS 3,732,984

APPARATUS FOR PRODUCING A CONTINUOUS COUNTER-CURRENT EFFECT

BACKGROUND OF THE INVENTION

The field of invention is liquid-solids contacting apparatus and methods for the use of such apparatus. Numerous specific types of species of liquid-solids contacting apparatus are presently employed for such liquid treatment operations as the removal of impurities, separation of components, absorption, recovery and ion exchange. In general, however, most species of the apparatus referred to fall into two general categories; that is, fixed bed contactors and moving bed contactors. In both cases, the term "bed" denotes a liquid permeable, usually granular body of sand, activated carbon, ion exchange resin and other such materials capable of effecting a desired treatment or process.

Although there presently exists in the art many commercially available embodiments of fixed and moving bed contactor apparatus which are admirably suited to the accomplishment of the function intended, serious shortcomings prevail with both general types as a result of basic design deficiencies. For example, fixed bed contactors can operate productively only for a limited duration of time after which some provision must be made for replacing or regenerating the solids bed through which liquid is passed. As a result, the overall efficiency of fixed bed contactors is low. While increased plant size and the development of refined, complicated operating components have helped to increase efficiency, other problems, such as leakage and the handling of large quantities of granular material, are presented.

In moving bed contactors, greater operating efficiencies are achieved, as compared with fixed bed contactors, by passing the moving bed in counter-flow relation to the liquid. Also moving bed contactors, in some instances, can accommodate continuous operation because of the facility to regenerate the solids, for example, at one station while the liquid-solids contacting operation is carried out at another station spaced upstream or downstream in relation to solids movement. However, the normally intended solids movement has resulted in many problems which include retaining the packed bed, uniform distribution, excessive solids attrition, unreliability of large valves in the solids bed and breakage of screens used for distributors and collectors.

SUMMARY OF THE INVENTION

The problems of the prior art are significantly reduced by the present invention, which enables a counter-current solid-liquid material transfer without moving the solids material. The present invention provides this ability by the provision of liquid conducting distributing and collecting members in a stationary bed of solids material, both forms of the liquid conducting members having a movable port for feeding raw liquids to and passing treated liquid from the bed. By advancing ports of both the distributing members and the collecting members progressively through the bed, a reasonably well defined and movable zone for liquid-solids contacting operations is established, thereby enabling treating and rinse operations, for example, to be carried on simultaneously.

Accordingly, it is an object of the invention to provide a fixed bed solids-liquid contacting device for simulating a continuous counter-current flow of solids and liquid.

It is a further object of the invention to provide a solids-liquid contacting device having means for continually varying the position of liquid inlets and outlets in relationship to the fixed bed.

It is a further object of the invention to provide a solids-liquid contacting device having an improved means for continually varying the rate of change of the position of liquid inlets and outlets.

DESCRIPTION OF THE PREFERRED EMBODIMENTS

Figure 1:
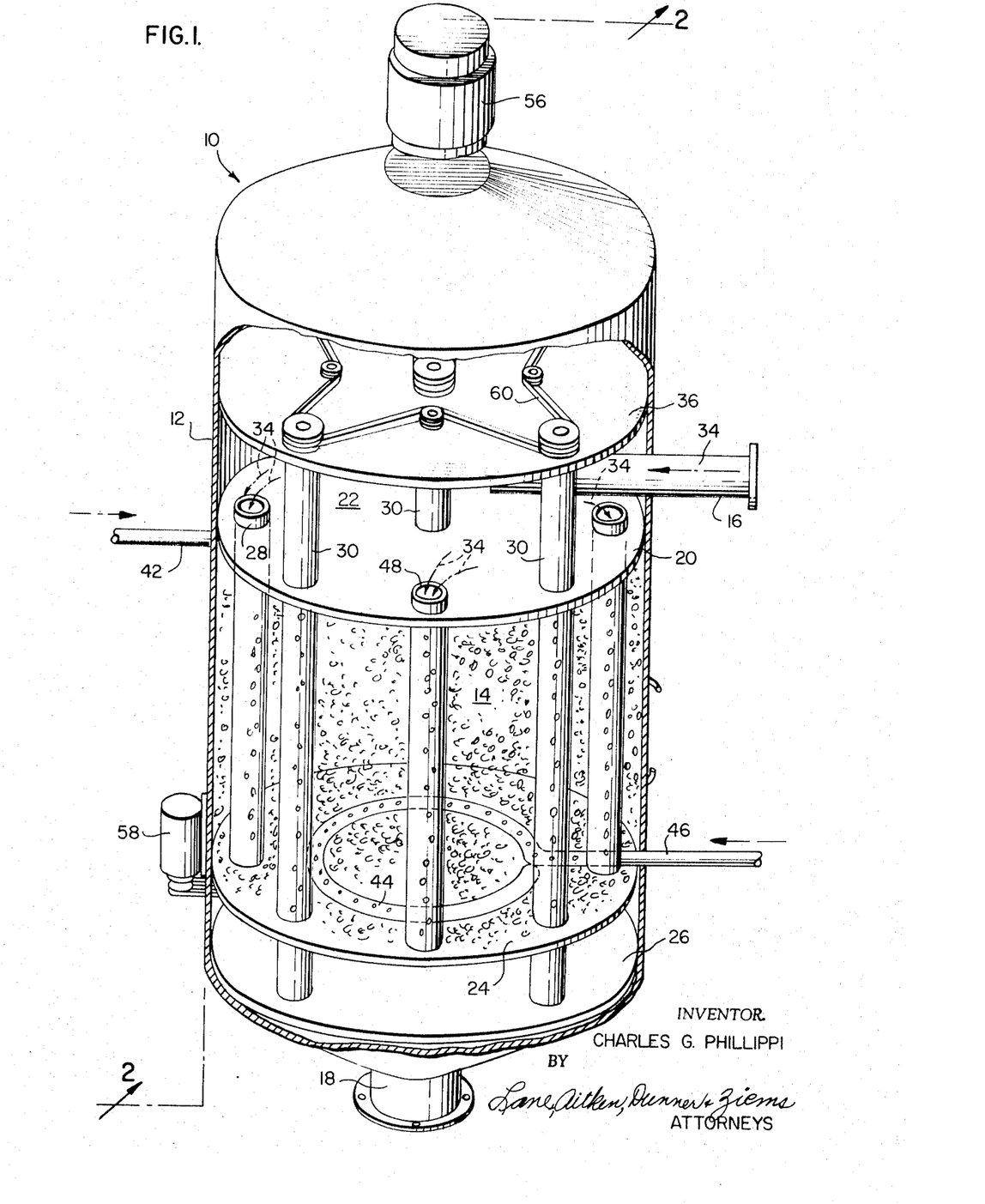
FIG. 1 is a perspective view partially in section of the solids-liquid contacting plant of the present invention.
Figure 2:
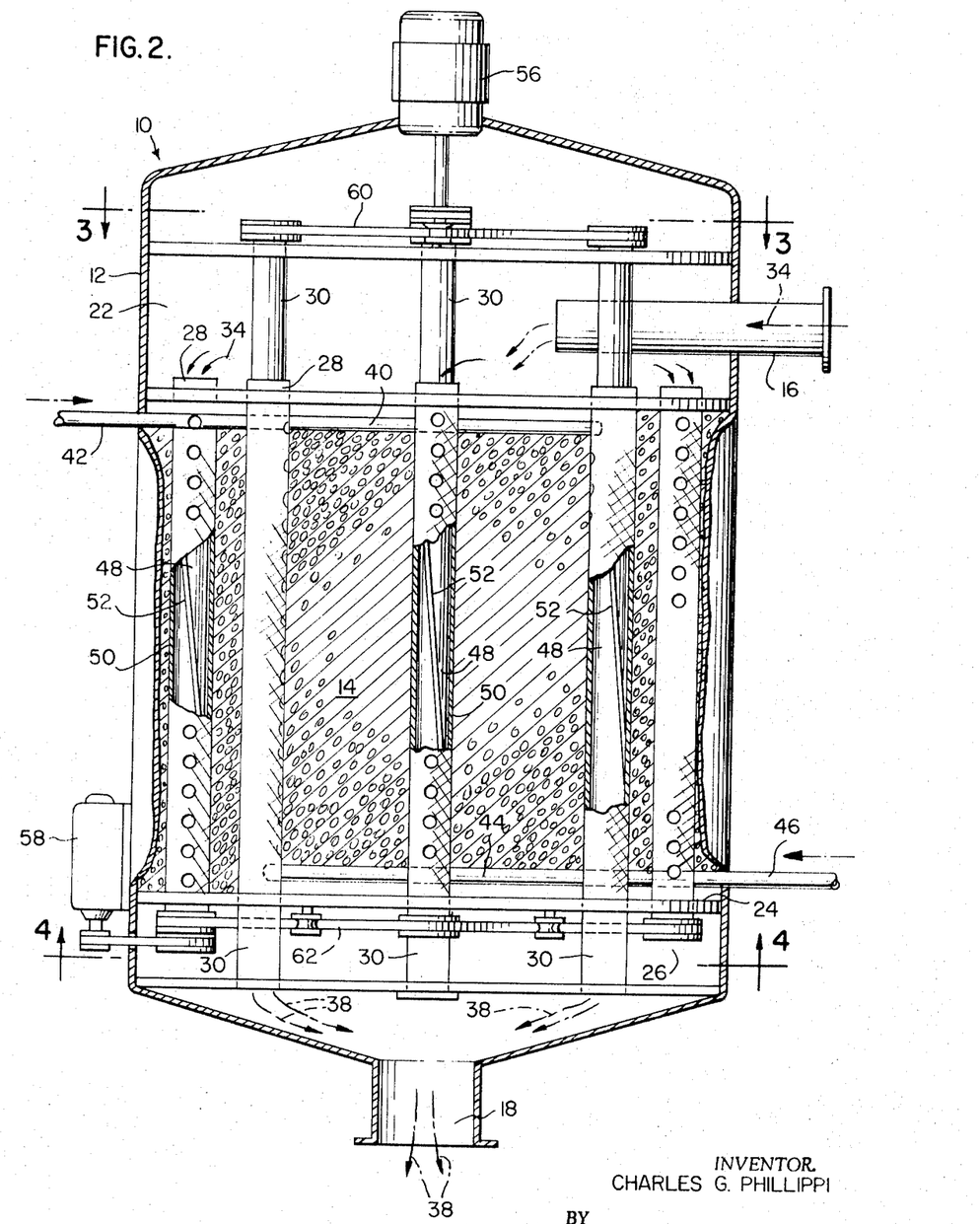
FIG. 2 is a sectional view taken along line 2—2 of FIG. 1.
Figure 3:
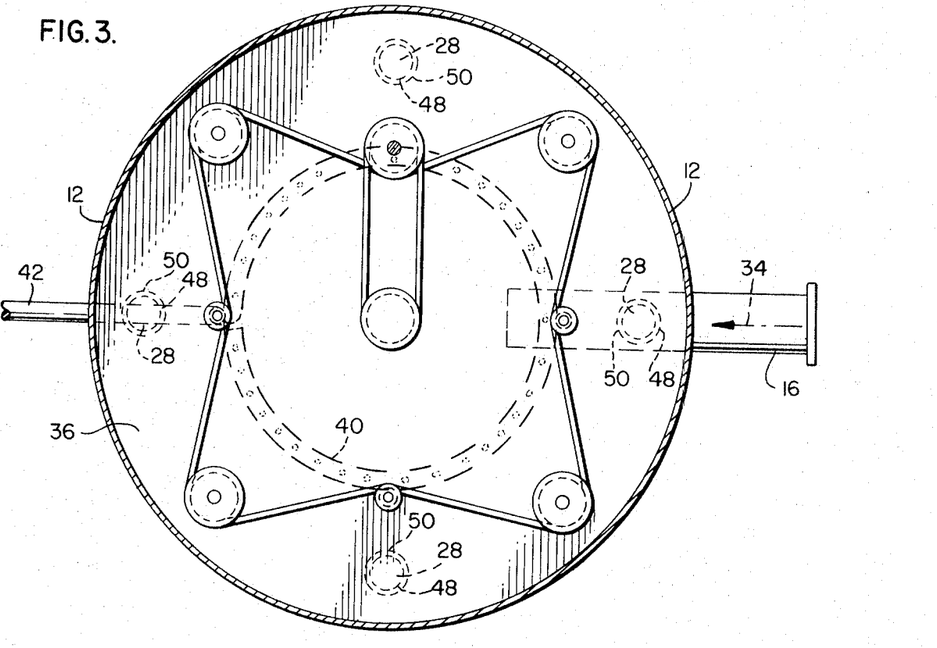
FIG. 3 is a sectional view taken along line 3—3 of FIG. 2.
Figure 4:
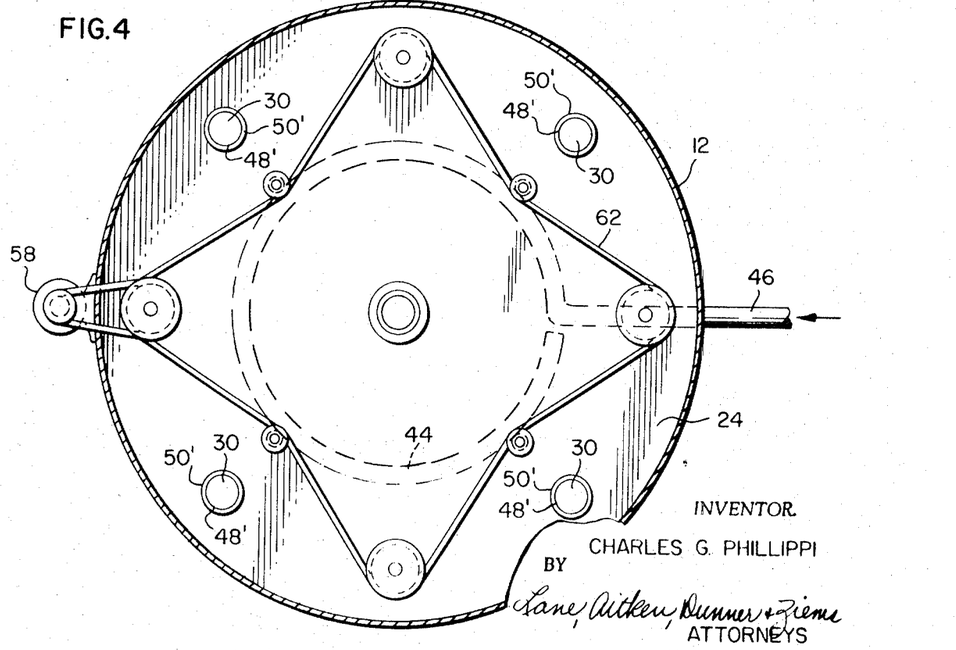
FIG. 4 is a sectional view taken along line 4—4 of FIG. 2.

The counter-current solids-liquid contacting plant of the present invention is generally indicated by reference numeral 10. Plant 10 is comprised of cylindrical vessel 12 which contains and provides lateral support for fixed bed 14. As is shown in FIG. 1 and FIG. 2 the shape of bed 14 is controlled by the shape of vessel 12. Thus fixed bed 14 is a column having the shape of a cylinder. Formed in vessel 12 are feed inlet conduit 16 and discharge outlet conduit 18.

As is explained in more detail below, liquid to be processed enters inlet 16, is distributed throughout a selected volume of the fixed bed, is collected and is passed from within the plant by outlet 18.

Formed in vessel 12 in the upper part of said vessel is plate 20. Plate 20 separates fixed bed 14 from upper chamber 22 of vessel 12. Located in the bottom portion of vessel 12 in a somewhat symmetrical relationship to plate 20 is bottom plate 24. Bottom plate 24 provides the bottom support for fixed bed 14 and separates this solid column of granular material from lower chamber 26 of vessel 12. Supported within vessel 12 and running vertically throughout fixed bed 14 are a plurality of conduits in the form of distributors 28 and collectors 30. The function of these conduits as collectors or distributors depends upon the orientation of these conduits within vessel 12 and their cooperation with either inlet 16 or outlet 18. In the design of plant 10, liquid distributors 28 extend through apertures in plate 20 and communicate with chamber 22. Thus a flow pattern through feed inlet 16 into distributors 28 as is indicated by arrows 34 is possible. The spaces between the apertures in upper plate 20 and the distributors are fitted with gaskets to prevent leakage of liquid into the fixed bed.

Distributors 28 are closed by a plate at their bottom end so that liquid to be processed which enters the distributors, as indicated by arrows 34, will exit only from the distributors via a passageway or port formed in the side of said distributor. A complete discussion of the port as it is found in both the distributors and collectors is given below. Distributors 28 are laterally supported at upper and lower ends in the apertures in plates 20 and 24 respectively. Distributors 28 extend through plate 24 so as to connect with a drive means more fully described below. Also supported in apertures in plate 24 are collectors 30. Collectors 30 extend through chamber 22 so that liquid entering the plant via inlet 16 will not enter into said collectors. An apertured plate 36 is provided as a ceiling for chamber 22. Collectors 30 extend through plate 36 and communicate with a drive means which is supported by plate 36. Collectors 30 have open bottom ends so that the liquid which has been processed can be collected into chamber 26 and passed through the plant via outlet 18 as is shown by arrows 38.

Positioned in the upper part of solids bed 14 is a rinse distributor 40. Rinse distributor 40 is an apertured tube having a general circular shape and is connected to a rinse inlet conduit 42. Rinse distributor 40 is so designed that a rinse which is introduced through conduit 42 passes throughout and precipitates a liquid rinse throughout bed 14. Placed at the bottom of solid bed 14 is a rinse collector 44. Rinse collector 44 is similar in appearance to rinse distributor 40 and has provided therein a rinse discharge outlet 46. Thus when required in the operation of a particular system, a rinse can be introduced into the plant via distributor 40, passed throughout the volume of bed 14 and collected by rinse collector 44.

Figures 5, 6, 6A, 7, 7A, 7B, 8:
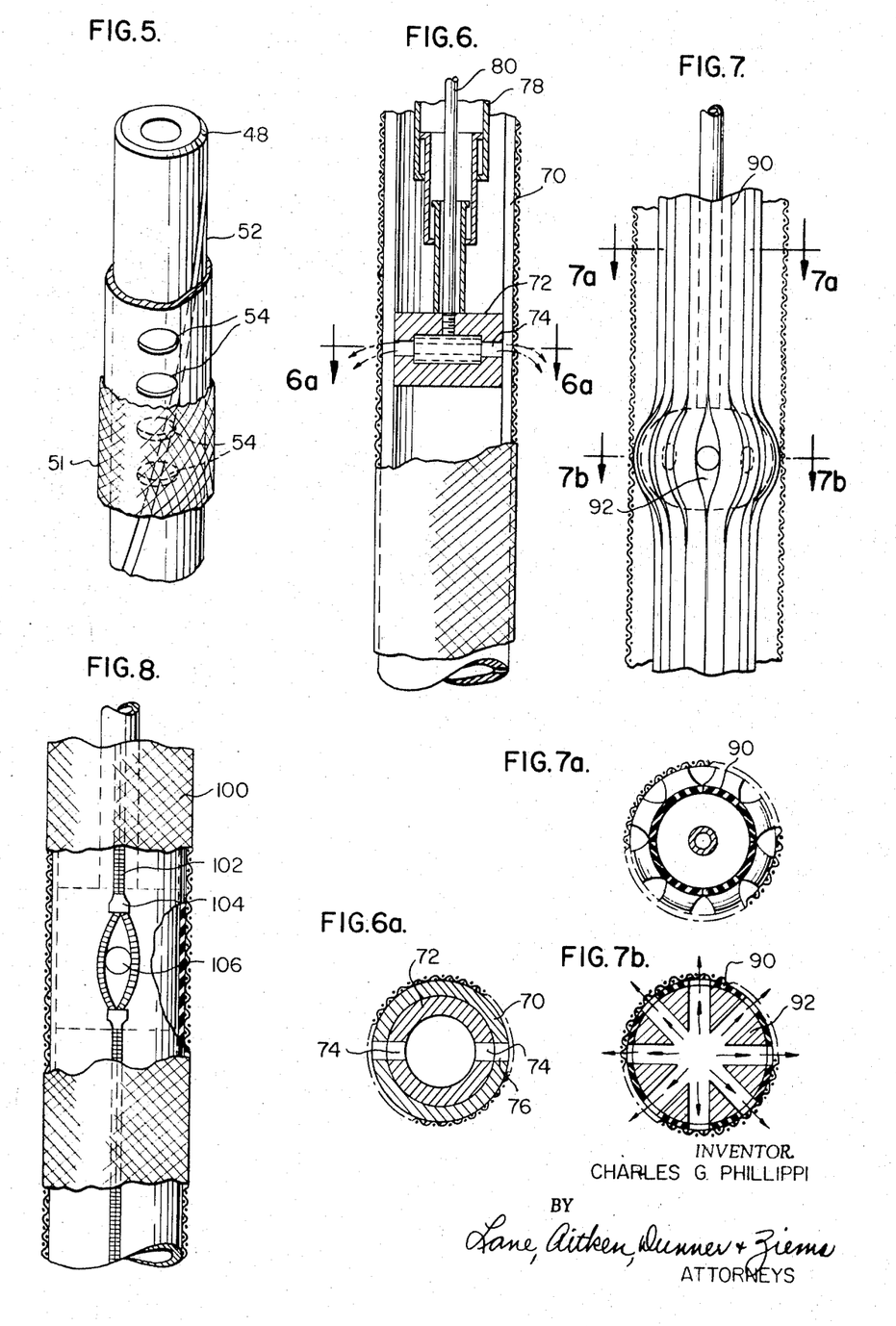
FIG. 5 is an enlarged perspective view of a liquid distributor and/or collector as found in the embodiment of the invention shown in FIG. 1 and FIG. 2.
FIG. 6 is a sectional view of a distributor and/or collector which is an alternate embodiment of the distributor shown in FIG. 5.
FIG. 6a is a sectional view taken along line 6a—6a of FIG. 6.
FIG. 7 is a sectional view of an additional embodiment of a distributor and/or collector.
FIG. 7a is a sectional view taken along line 7a—7a of FIG. 7.
FIG. 7b is a sectional view taken along line 7b—7b of FIG. 7.
FIG. 8 is a sectional view of an additional embodiment of a distributor and/or collector.

The operation of distributors 28 and collectors 30 can be understood by reference to FIG. 5. In one embodiment of the invention both distributors 28 and collectors 30 are each comprised of a pair of concentric tubes. Inner tubes 48, 48' have spiral slots 52 which run the entire length of that part of inner tubes 48, 48' which are within the column of solid bed 14. Other tubes 50, 50' each have a plurality of vertically formed apertures 54. Apertures 54 are arranged vertically in a single line which runs the entire length of that part of outer tubes 50, 50' which are within the column of solid bed 14. The apertures are in close proximity to each other so that several apertures communicate with the spiral in each inner tube 48 at any given orientation of tube 48.

As is shown in FIG. 5, the design of distributors 28 and collectors 30 is such that when an inner tube 48, 48' is rotated a passageway from within inner tube 48, 48' through outer tube 50, 50' is formed progressively down the collectors and distributors as rotation occurs. Outer tube 50, 50' is provided with a screen 51. Screen 51 is fitted over tube 50, 50' and has a mesh size sufficient to prevent the solids material from entering the concentric tube arrangement. Thus a liquid to be processed enters a distributor 28, as is shown by arrow 34 and, after filling the column of said distributor, passes throughout an opening when such an opening appears in said distributor. The liquid passes throughout the solid bed until it reaches the level of an opening in a collector 30, whereupon the processing liquid will enter into the collector through the opening formed by the alignment of spiral 52 and apertures 54. Once the processed liquid has entered a collector, a differential in pressure will cause the liquid to flow into chamber 26 and out outlet 18 as in indicated by arrows 38. In order to provide such a flow scheme the bed normally has a liquid (termed bed liquid) incorporated therein throughout its entire volume. A slight positive pressure is applied through inlet 16. The action of the slight positive pressure against the bed liquid creates a preferred route for the processing liquid, which preferred route is between the passageways as they appear on distributors and collectors. The bed liquid which is contained throughout the entire volume of bed 14 varies depending upon the contacting system. Normally this liquid is water.

One distinct advantage of the device of the instant invention is that the outlet ports for the processing liquid travel down the solid bed column thus processing liquid can be collected at any point and any processing liquid left behind will ultimately be collected when the passageway or port on a collector is at the very bottom of the bed. Should some processing liquid deviate from the intended path of travel, the force of gravity will cause such liquid to fall to the bottom of the bed, whereupon this processed liquid would exit from the system when an exit port appears on a collector at the bottom of the solid bed.

Located on vessel 12 are motors 56, 58. Motor 56 is operatively connected to belt 60 which drives inner tubes 48' of collectors 30. Motor 58 is operatively connected to distributors 28 by belt 62. Thus motor 58 provides a means for rotating inner tubes 48 of distributor 28. Electric motors 56 and 58 enable controlled variation of the rotational speed of inner tubes 48, 48'.

An advantage of the contacting plant of the instant invention is that the distance between an inlet and an outlet can be varied from system to system yet this distance can remain constant during a given cycle.

Each embodiment of the invention involves a contacting plant having a means for continuously varying the position of the inlet and outlet ports of the contacting liquid in relationship to the column of solids material.

The embodiment shown in FIG. 5 provides such a means. However, the invention is not intended to be limited to the specific arrangement shown in FIG. 5. Other means for changing the position of the inlet and outlet ports in relationship to the fixed bed are possible. For example, in FIG. 6 a slotted column 70 is shown. Column 70 is intended to be oriented in a fixed bed in a manner similar to the orientation of distributors 28 and collectors 30 of FIG. 1 and FIG. 2. Column 70 functions as a distributor or a collector. Positioned within column 70 is a piston head 72 which has a passageway 74 communicating with slot 76 in column 70. Piston 72 is attached to a telescoping hermetically sealed column 78. A screw drive means 80 is attached to piston 72. Thus by the same type of drive means shown in FIG. 2 piston 72 can be controllably advanced down the length of tube 70. As piston 72 moves down the tube a controllably moving entrance port into the solid bed is provided. An exit port can be provided by orienting column 70 in a manner similar to the orientation of collectors 30 in FIG. 1 and FIG. 2.

An alternative scheme is shown in FIG. 7. In FIG. 7 a column 90 is shown. Column 90 is formed of a rigid rubber material having a plurality of vertical slits running its entire length. The material is rigid enough so that the slits form a hermetical seal when in a normally closed position. A piston head 92 in the form of a hollow sphere having a closed bottom, open top and side apertures is provided. The piston 92 has a diameter larger than the diameter of column 90. Thus as the location of piston 92 is varied by a screw drive arrangement similar to that shown in FIG. 5, an opening in column 90 is controllably varied along the length of said tube 90. With this and other means for varying port positions the orientation of the column determines whether the column is to function as a distributor or a collector.

An alternate possibility is shown in FIG. 8. In FIG. 8 a column 100 having a track 102 is shown. Track 102 can be described as a zipper which is designed to remain closed as slide 104 travels along said zipper. Slide 104 has an opening 106 which is simply an aperture formed in said slide. Slide 104 is connected by a screw drive (not shown). The screw drive provides a means for moving aperture 106 in slide 104 vertically along tube 100, thus providing a means for varying the position of a processing liquid inlet or outlet.

Figures 9, 10A:
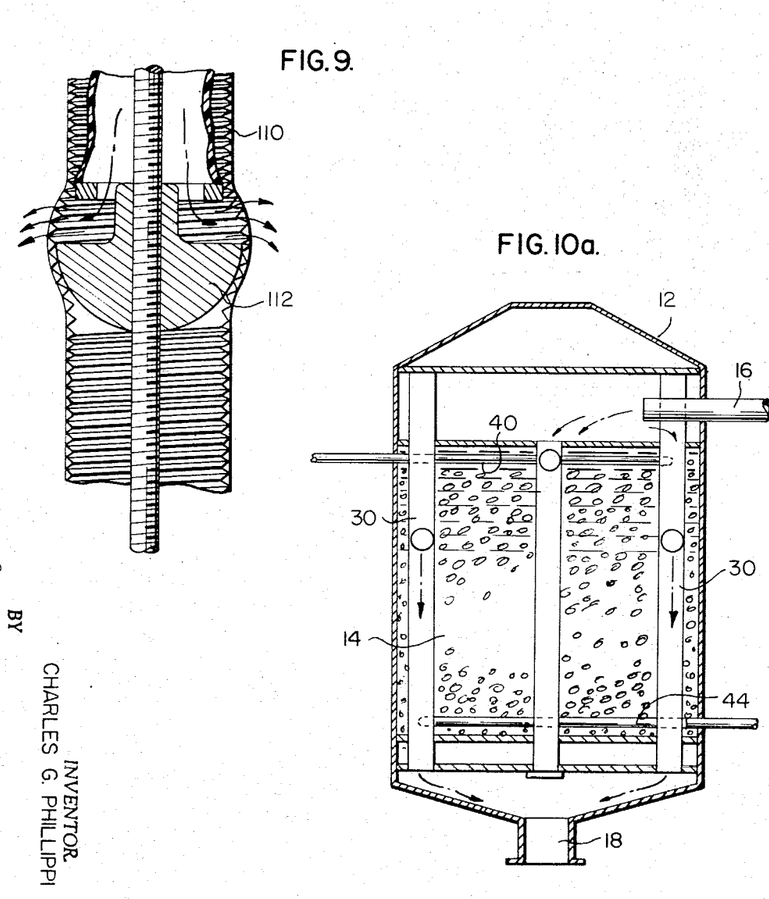
FIG. 9 is a sectional view of an additional embodiment of a distributor and/or collector.
FIG. 10a and 10b are schematic diagrams illustrating the operation of the plant shown in FIG. 1 and 2.

In FIG. 9 a spiral wire or well screen forms column 110. The well screen is of the type which prevents passage of liquid therethrough. Provided within column 110 is a piston head 112 similar to piston 92 described in FIG. 6. Piston 112 also has a diameter larger than the diameter of column 110. Thus as piston head 112 is moved vertically up and down column 110 piston 112 pushes the well screen which forms column 110 and spreads the screen apart providing a passageway.

Figure 10B:
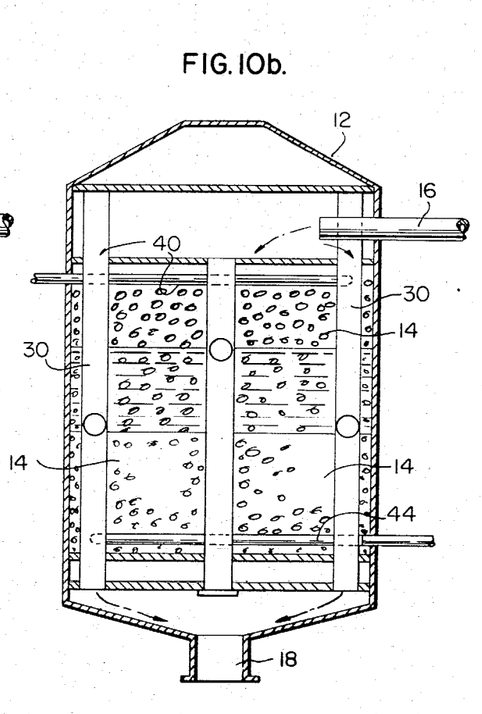

The operation of the plant is illustrated schematically in FIG. 10a and 10b. Prior to the contacting operation, granular material which forms the solids column is introduced into vessel 12. Contacting liquid is then introduced into vessel 12 through feed inlet 16. For ease of understanding, the schematic illustration of FIG. 10a and 10b shows only one distributor and two collectors. The liquid flows into a distributor 28 and is distributed outwardly and downwardly, collected by collector 30 and discharged through discharge outlet 18 as indicated by the arrows. As liquid flows through the solid material of bed 14 a counter-current contact effect is produced. While contacting liquid is flowing, the position of the inlet and outlet ports is moved downwardly. After a short period of time the liquid in the bed will be positioned as it is shown in FIG. 10b. In order to fill the void spaces between the granular material and maintain the top of the processing liquid about even with the inlet on distributor 28 a displacement rinse is discharged from rinse distributor 40. Void water is withdrawn from the system by rinse collector 44 until the processing liquid reaches bottom. The rinse is withdrawn by rinse collector 44 after the processing liquid has passed through and from the tank entirely.

It can be readily seen that when the ports reach the bottom of the column, the system should be switched to another plant in order to effect a truly continuous operation. As is normal in the art, a three plant system is provided.

However, in accordance with the present invention the system enables the outlet of one bed to be switched to the entrance of a second bed while maintaining the same processing bed depth. When the bed depth in the second bed has been extended to the required maximum volume, the bed depth in the first bed is reduced to zero. At this precise moment a switch is made directly from the feed stream to the inlet of the second bed. Such a continuous operation is possible because in the disclosed system there is no appreciable increase in the pressure drop. This arrangement is distinguishable from the prior art systems since in such prior art systems the feed stream is switched directly from the inlet of the second bed. This type of switching set-up is required with the prior art systems because of the severe pressure drop between the two beds.

Figure 11:
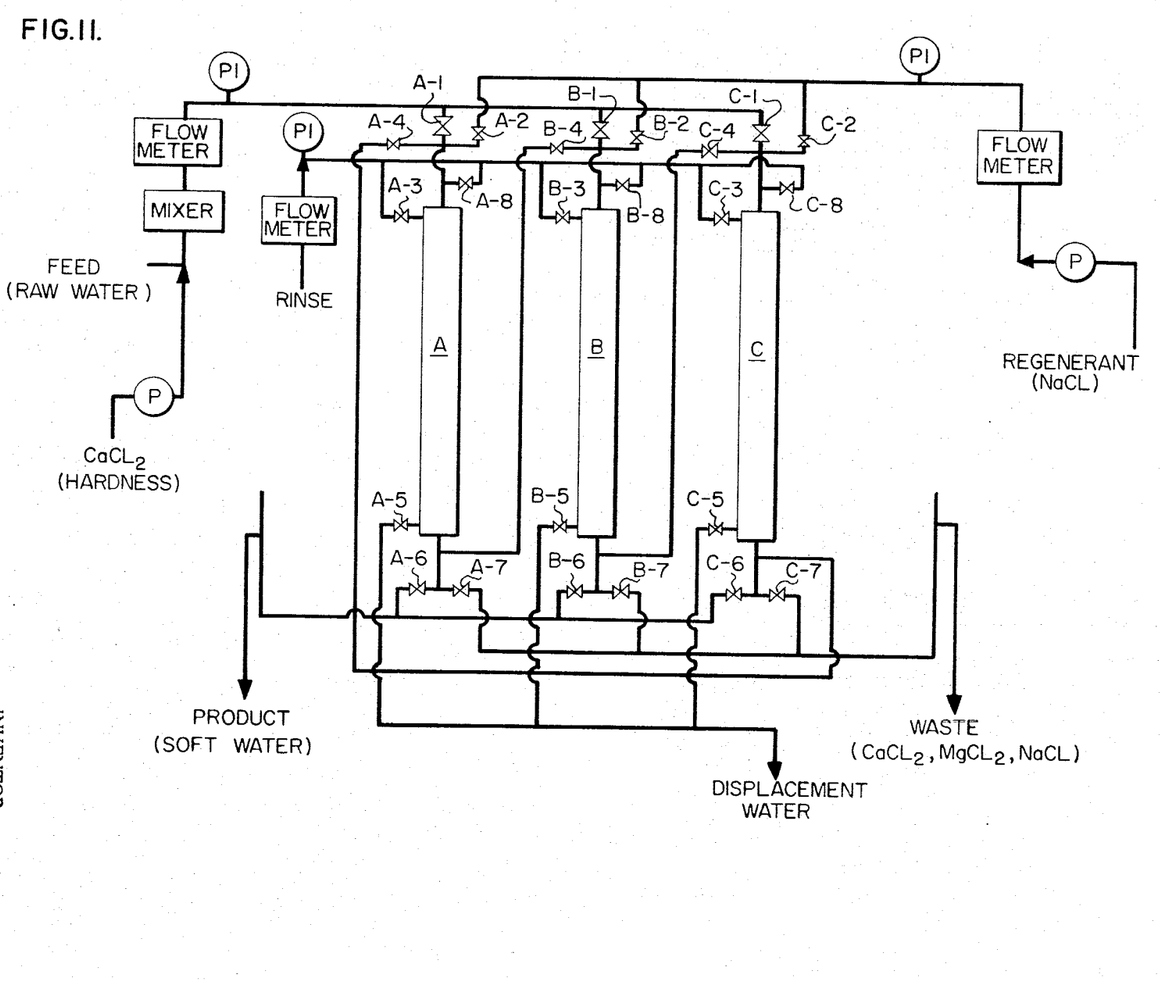
FIG. 11 and FIG. 12a through 12r are schematic diagrams illustrating the basic functions of loading, regenerating and rinsing with three plants of the present invention.
Figure 12A:
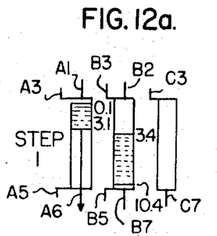
Figure 12B:
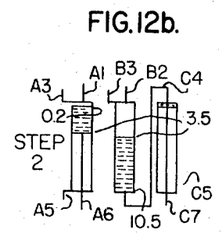
Figure 12C:
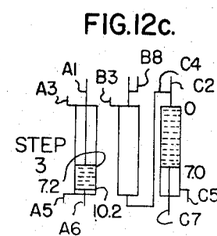
Figure 12D:
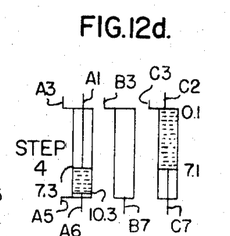
Figure 12E:
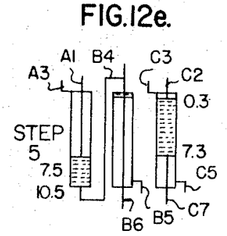
Figure 12F:
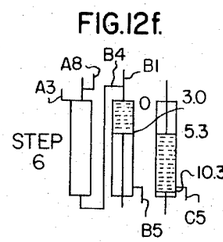
Figure 12G:
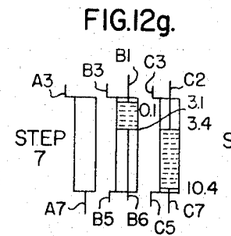
Figure 12H:
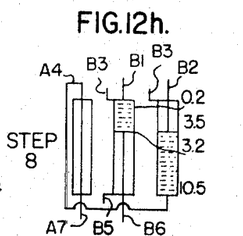
Figure 12I:
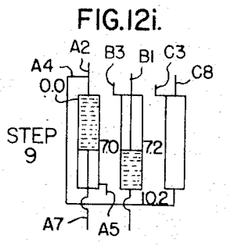
Figure 12J:
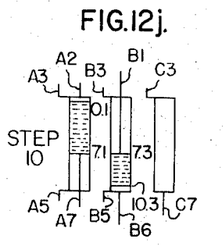
Figure 12K:
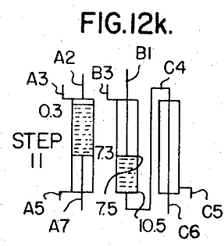
Figure 12L:
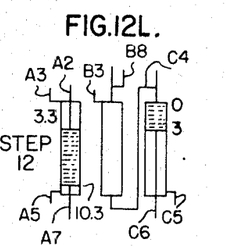
Figure 12M:
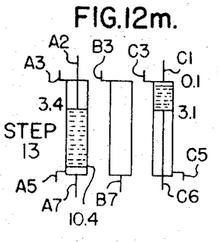
Figure 12N:
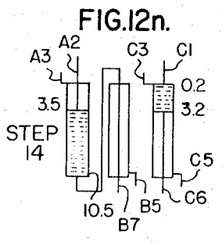
Figure 12O:
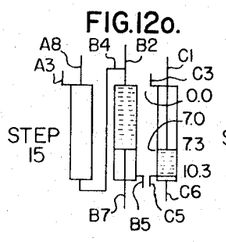
Figure 12P:
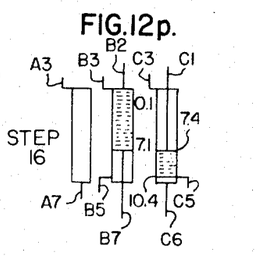
Figure 12Q:
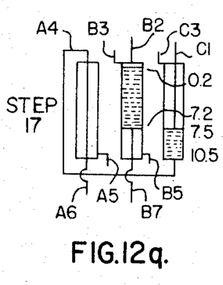
Figure 12R:
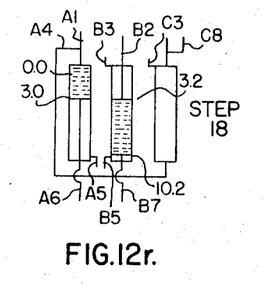

Operation of the three plant systems in accordance with the present invention is shown in FIG. 11 and FIG. 12a through 12r.

In FIG. 11 various valves are indicated. A description of these valves is given in Table 1 below:

Table 1

| Valve No. | Function | Type |
|---|---|---|
| A1, B1, C1 | Feed inlet | Solenoid |
| A2, B2, C2 | Regeneration inlet | Solenoid |
| A3, B3, C3 | Displacement rinse | Solenoid |
| A4, B4, C4 | Column switch | Solenoid |
| A5, B5, C5 | Displacement rinse outlet | Solenoid |
| A6, B6, C6 | Product outlet | Solenoid |
| A7, B7, C7 | Waste outlet | Solenoid |
| A8, B8, C8 | Tube rinses | Solenoid |

Referring to Table 1 in conjunction with FIG. 11 and FIG. 12a – 12r, the basic functions of loading, regenerating and rinsing with three plants in accordance with the instant invention are shown. In the drawing, the liquid beds are shown as though they are precise units. It is to be understood that an actual liquid bed cannot be as easily defined, however; such a definition renders the schematic diagram easier to understand. In FIG. 11 all of the valves necessary to illustrate the system are shown. In FIG. 12a – 12r only open valves are shown. In addition, FIG. 12a – 12r also show the location in feet of inlet and outlet ports in relation to the length of the solids column. In the particular system shown in FIG. 12a – 12r, the actual height of the solid material column is 10.5 feet.

The following steps illustrate the continuous operation of a three plant system for softening hard water:

Step 1. In FIG. 12a a loading bed of 3.0 feet is shown. Valve A1 is open and hard water enters, distributes through the resin bed and exists at the 3.1 foot level through valve A6. At the same time a displacement rinse enters through valve A3. A rinse is not normally necessary for water softening but is included to illustrate how the rinse functions. Rinse outlet valve A5 is open in order to bleed off the void volume of liquid. In column B, the regeneration bed is at the bottom from the 3.4 foot level to the 10.4 foot level. A regenerate enters through valve B2 and the displacement rinse enters through valve B3 and exits through valve B5. The regenerate waste exits through valve B7. Simultaneous with this operation, column C is fast rinsed.

Step 2. In FIG. 12b, loading in column A has moved to the 0.2 foot level. In column B regeneration has reached the bottom and the effluent is switched to the top of column C. At this point the inlet and outlet ports on columns A and B are at the same level. From this point in time to the next step, the outlet ports will move on column C and the inlet ports will move on column B. When these ports reach bottom in Column B step 3 takes place.

Step 3. In FIG. 12c, loading has almost reached the bottom of column A, e.g., the 10.2 foot level. At this time the regenerate is rinsed from column B through valve B8. The regenerate bed has moved to the 7.0 foot level, the maximum length in column C.

Step 4. In FIG. 12d, column B is undergoing a fast rinse.

Step 5. In FIG 12e, the loading outlet ports are at the bottom of column A and the effluent is switched to column B. The regenerate is moved down column C. The regenerate depth in column C is 7.0 feet.

Step 6. In FIG. 12f, the loading liquid bed is moved to column B entirely.

Steps 7 through 18 are repeats of steps 1–6 through each column B and C respectively. These steps are shown in FIG. 12g through FIG. 12r.

A valve operational event chart which shows the position of all valves during any step is given in Table 2 below.

nisms driven by an electric motor as shown in FIG. 1–5. Each distributor is mounted with the inlet liquid entering at the top and exiting through a hole or port that moves down the column at a rate of 0.1 ft./per minute.

Several collectors or outlet tubes (½ inch nominal pipe size) are arranged within the solids columns and are spaced equidistant and circumferentially. All these tubes (inlet and outlets) are covered with 100 mesh woven "Saran" cloth screen. The moving hole mechanism is moved at the same rate as the inlet.

The processing liquid after passing through a selected volume of the solids column enters the collectors and exists through the open bottom end of the collector into a collection chamber.

The feed rate is 27 gals. per minute of liquid with a hardness concentration of 0.01 equivalents per liter. The process is started by passing this feed liquid through a depth of three feet of column A. This is achieved by presetting the distance between the inlet and outlet holes 3 ft. apart. These holes are moved down the column in the direction of liquid flow at the rate of 0.1 ft./minute. The reaction for this portion of the process is:

$$R_{(Resin)}Na_2 + CaCO_3 \rightarrow R_{Resin}Ca + Na_2CO_3$$

While exhaustion or loading is taking place in column A, regeneration is taking place in column B. The regenerant is sodium chloride brine (5 eq/1) at a rate range of approximately 200 to 300 ml/minute. The distance between the regenerant inlet point and the exit is 7 feet.

TABLE 2.—OPERATIONAL EVENT CHART

| | Step | Start | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|---|---|
| | Valve ↓ | | | | | | | | | | | | | | | | | | | | |
| F | A1 | O | O | O | O | O | O | X | X | X | X | X | X | X | X | X | X | X | X | X | O |
| R | A2 | X | X | X | X | X | X | X | X | X | X | O | O | O | O | O | O | X | X | X | X |
| | A3 | X | O. | O. | O. | O. | O. | O | X | O | X | O. | O. | O. | O. | O. | O | X | O | X | X |
| | A4 | X | X | X | X | X | O. | X | X | X | O | O | X | X | X | O. | X | X | X | X | X |
| | A5 | O | O. | O. | O. | O. | X | X | X | O. | O. | O. | O. | X | X | O. | X | X | X | O. | O. |
| P | A6 | O | O | O | O | O | X | X | X | X | X | X | X | X | X | X | X | X | X | O | O |
| W | A7 | X | X | X | X | X | X | X | O | O | O | O | O | O | O | X | O | X | O | X | X |
| | A8 | X | X | X | X | X | X | O | O | X | X | X | X | X | X | X | X | O | X | X | X |
| F | B1 | X | X | X | X | X | O | O | O | O | X | X | X | X | X | X | X | O | X | X | X |
| R | B2 | O | O | O | X | X | X | X | X | O | X | X | X | O | X | X | O | O | O | O | O |
| | B3 | O. | O. | O. | X | O. | X | X | X | O. | O. | O. | O. | O | X | X | O | O. | O. | O. | O. |
| | B4 | X | X | X. | X | X | O | O | X | X | X | X | X | X | O | X | O | X | O | X | X |
| | B5 | O | O | O | O | X | O. | O. | O. | O. | O. | O | X | X | O. | O. | O. | O. | O. | O. | O. |
| P | B6 | X | X | X | X | X | O | O | O | O | O | O | X | X | X | X | O. | X | O. | X | X. |
| W | B7 | O | O | O | O | X | X | X | X | X | X | X | X | O | X | O | X | O | X | O | O |
| | B8 | X | X | X | O | X | X | X | X | X | X | X | X | O | X | O | X | O | X | O | O |
| F | C1 | X | X | X | O | O | O | X | X | X | X | X | X | X | O | O | X | O | X | O | X |
| R | C2 | X | X | X | O | O | O | O | O | X | X | X | X | X | O | X | X | X | X | X | X |
| | C3 | X | O | X | X | O. | O. | O. | O. | O. | O | X | X | X | O. | O. | O. | O. | O. | O. | O. |
| | C4 | X | X | O | O | X | X | X | X | X | X | X | X | X | O | X | X | X | X | X | X |
| | C5 | X | X | O. | O. | O. | O. | O. | O. | X | X | X | X | O. | O. | O. | O. | X. | O. | X. | O. |
| P | C6 | X | X | X | X | X | X | X | X | X | X | X | X | O. | O. | O. | O. | O. | O. | X | X |
| W | C7 | X | O | O | O | O | O | O | O | X | X | X | O | O | O | O | O | O | O | X | X |
| | C8 | X | X | X | X | X | X | X | X | X | O | X | X | X | X | X | X | X | X | X | O |

NOTE.—F=Feed; R=Regeneration; P=Product; W=Waste; O=Open; X=Closed; O.=Throttled.

The contacting plant of the instant invention is typically illustrated by the following process which is a method of softening water by the exchange of sodium ion for calcium ions with an ion exchange material. In example 1 the ion exchange material is a standard cation exchange resin known as Dowex 50W. The resin size is 20 – 50 mesh.

EXAMPLE 1

In this example, the apparatus is comprised of three concentric solids columns as shown in FIG. 12a – 12r. The columns are 12 inches in diameter and interconnected with valving and piping. In this example, the ion exchange bed depth in each column is 10½ ft.

Each column is equipped with several ½ inch nominal pipe size inlet distributors with moving hole mecha- The rate of movement of the points is the same as the feed inlet (0.1 ft./minute).

The regenerant reaction is:

$$R_{Resin}Ca + 2\ NaCl \rightarrow R_{Resin}Na_2 + CaCl_2$$

The third column is started by rinsing. When the outlet for the regenerant stream has reached the bottom of column B, this stream is switched to the inlet of column C. At this point the inlet and exit ports on column C are positioned at the same level. At once the outlet hole is moved in column C at the same rate that the inlet is moved in Column B (0.1 ft./minute). This maintains a constant regenerant bed depth of 7 feet, since as the depth decreases in Column B it increases the same amount in column C until the point where the inlet has reached the bottom of column B. At this time the outlet in column C is moved to a distance of 7 feet from the inlet, whereupon the regenerant supply is switched directly to column C. Column B is by-passed and a rinse cycle is commenced in column B in preparation of the feed stream to be switched into column B.

At the conclusion of the rinse of column B the feed stream outlet position has reached the bottom of column A whereupon it is switched to column B. In the rinsing step the inlet and outlet positions in column B are retracted to the top of the column. Thus when the feed stream outlet from the column A switches to column B the inlet and outlet positions are at the same level. But immediately the outlet hole is moved downward in direction of liquid flow at the same rate as the inlet hole is moved in column A (0.1 ft./minute). When the inlet in column A has reached the bottom of column A the distance between the inlet and outlets in column B is 3 feet. At this point the feed supply is switched directly to column B. The inlet hole and the outlet hole is moved down column B simultaneously and at the same rate. While water softening is taking place in column B, column A is rinsed and the inlet and outlets retracted to the top of the column in preparation for the switch of the regenerant stream from column C.

The process of water softening as is described in Example 1 illustrates the utility of the plant of the instant invention. As was disclosed in the introduction to this specification, the disclosed contacting plant has utility in a variety of processes. For example, when the solids bed comprises activated carbon, the plant can efficiently process sugar so as to remove color impurities.

The disclosed plant also finds utility in the bright dipping of aluminum process. In this process, aluminum metal is dipped into a tank containing phosphoric acid. While the metal is in the tank the following reaction takes place:

$$2 H_3PO_4 + 2 Al \rightarrow 2 AlPO_4 + 3 H_2$$

When retracted from the tank, a bright shiny surface appears on the aluminum. The phosphoric acid in the tank, however, is contaminated with aluminum phosphate. By pumping the contaminated phosphoric acid into the disclosed plant, the phosphoric acid can be cleaned and delivered back into the same tank.

Within the contacting plant the following reactions occur as the phosphoric acid is purified. In the reactions given below the resin can be any acid type ion exchange resin:

Recovery reaction: $R_{Resin}H + AlPO_4 \rightarrow R - Al + H_3PO_4$

Regeneration reaction: $Al + H_2SO_4 \rightarrow RH - Al_2(SO_4)_3$

In addition to the foregoing examples, the following reactions proceed more efficiently when the disclosed contacting device is employed in a system for such reactions:

Acid-Salt Conversion $$RH + KCl \rightarrow RK + HCl$$
$$RK + HNO_3 \rightarrow RH + KNO_3$$

Rinse Water Recovery cation $$MX_2 + R2H \rightarrow RM + HX$$
$$RM + H_2SO_4 \rightarrow R2H$$

anion $$HX + ROH \rightarrow RCl + HOH$$
$$RX + NaOH \rightarrow ROH + NaCl$$

where M is a metal ion and X is the anion.

The above examples are illustrative of the utility of the disclosed contacting apparatus. Other reactions are contemplated and the invention is not intended to be limited by the examples given above.

In accordance with the instant invention a counter-current flow effect is produced without moving the solid bed. The invention allows controlled variation of the counter-current flow rate, enabling a controlled effluent concentration far superior to that which is possible in incremental systems.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A liquid-solids contacting apparatus comprising a vessel containing a fixed bed of solids material having a processing liquid inlet and a processed liquid outlet, a processing liquid distributor within said vessel having a port therein communicating with said processing liquid inlet, a liquid collector having a port therein communicating with said processed liquid outlet, means for locating said port on said distributor at the top of said fixed bed and means for locating said port on said collector at a predetermined distance below said port on said distributor to provide a predetermined liquid bed throughout a selected volume of said fixed bed when liquid is introduced into said fixed bed by said distributor and withdrawn from said fixed bed by said collector, means for continuously varying the position of said port on said distributor in relationship to and along the longitudinal axis of said fixed bed and means for continuously varying the position of said port on said collector in relationship to and along the longitudinal axis of said fixed bed to enable a continuous non-incremental movement of said liquid bed through said fixed bed of solids material, one of said distributor and collector comprising an inner tube concentrically positioned in an outer tube, said inner tube having a spiral slot along its length and said outer tube having a line of vertically spaced apertures along its length so that when said spiral rotates relative to said apertures said spiral will communicate with said bed progressively along the length of said outer tube.

2. The apparatus in claim 1, wherein said apertures and said spiral are spaced and dimensioned so that more than one aperture communicates with said spiral at any orientation of said inner tube.

3. The apparatus in claim 1, further including means for rotating said inner tube.

4. The apparatus as set forth in claim 3, wherein said means for rotating said tube comprises a drive belt on said inner tube connected to a motor.

5. A liquid-solids contacting apparatus comprising a vessel containing a fixed bed of solids material having a processing liquid inlet and a processed liquid outlet, a processing liquid distributor within said vessel having a port therein communicating with said processing liquid inlet, a liquid collector having a port therein communicating with said processed liquid outlet, means for locating said port on said distributor at the top of said fixed bed and means for locating said port on said collector at a predetermined distance below said port on said distributor to provide a predetermined liquid bed throughout a selected volume of said fixed bed when liquid is introduced into said fixed bed by said distributor and withdrawn from said fixed bed by said collector, means for continuously varying the position of said port on said distributor in relationship to and along the longitudinal axis of said fixed bed and means for continuously varying the position of said port on said collector in relationship to and along the longitudinal axis of said fixed bed to enable a continuous non-incremental movement of said liquid bed through said fixed bed of solids material, one of said distributor and collector including guide means extending along said bed, a member in said guide means movable along the length thereof, said member including said port communicating with said bed, and means for moving said member along said guide means.

6. The apparatus in claim 5, wherein said guide means and member comprises a first slotted column, a piston head with a passageway within said column, said passageway communicating said port with the slot in said column, and a telescoping hermetically sealed second column within said first column, said second column being connected to said piston head so as to provide a channel passageway with said piston head, and drive means for moving said piston head along said column.

* * * * *